United States Patent
Wenning

(10) Patent No.: US 6,849,705 B2
(45) Date of Patent: Feb. 1, 2005

US006849705B2

(54) BIFUNCTIONAL POLYADDITION COMPOUNDS AS CROSSLINKERS FOR POLYURETHANE POWDER COATINGS

(75) Inventor: Andreas Wenning, Nottuln (DE)

(73) Assignee: Degussa AG, Duesseldorf (DE)

( * ) Notice: Subject to any disclaimer, the term of this patent is extended or adjusted under 35 U.S.C. 154(b) by 3 days.

(21) Appl. No.: 10/435,017

(22) Filed: May 12, 2003

(65) Prior Publication Data

US 2003/0212239 A1 Nov. 13, 2003

(30) Foreign Application Priority Data

May 11, 2002 (DE) .......................................... 102 27 183

(51) Int. Cl.$^7$ .............................................. C08G 18/79
(52) U.S. Cl. ...................... 528/73; 252/182.2; 525/127; 525/111; 525/454; 525/440
(58) Field of Search ........................ 252/182.2; 528/73; 525/127, 111, 454, 440

(56) References Cited

U.S. PATENT DOCUMENTS 4,801,623 A    1/1989   Hess et al.

FOREIGN PATENT DOCUMENTS

| EP | 0 443 138 | 8/1991 |
|---|---|---|
| EP | 0 566 953 | 10/1993 |
| EP | 0 874 010 | 10/1998 |

*Primary Examiner*—Rachel Gorr
(74) *Attorney, Agent, or Firm*—Oblon, Spivak, McClelland, Maier & Neustadt, P.C.

(57) ABSTRACT

A polyaddition compound having uretdione and carboxyl groups, and having a melting range of between 40 and 200° C., a free NCO group content of from 0 to 5% by weight and an NCO functionality of at least 1.5, and a number-average molar mass of between 1000 and 10,000, may be prepared by reacting at least one polyisocyanate containing uretdione groups, at least one hydroxycarboxylic or mercaptocarboxylic acid, and one or more of at least one monofunctional compound having a functional group which is reactive toward an isocyanate, at least one aliphatic and/or cycloaliphatic polyol, at least one polyol having functional groups, and at least one aliphatic and/or cycloaliphatic polyamine. Polyurethane plastics, especially polyurethane powder coating materials may be prepared from the polyaddition compound of the present invention.

55 Claims, No Drawings

BIFUNCTIONAL POLYADDITION COMPOUNDS AS CROSSLINKERS FOR POLYURETHANE POWDER COATINGS

BACKGROUND

1. Field of the Invention

The present invention relates to polyaddition compounds containing uretdione and carboxyl groups and to a process for preparing them. The invention further relates to methods of preparing polyurethane plastics, especially as crosslinkers for polyurethane (PU) powder coating materials, from these polyaddition compounds. These PU powder coating materials may comprise hydroxyl-containing polymers and compounds which react with carboxyl groups. For example, these PU powder coating materials may include polyepoxides and hydroxyalkylamides.

2. Discussion of the Background

Heat-curable pulverulent compositions obtained by reacting a hydroxyl-containing resin with a blocked polyisocyanate are known, and are in widespread use. Conventional PU powder hardeners include, for example, blocked polyisocyanates such as ε-caprolactam-blocked isophorone diisocyanate (IPDI) adducts. Such adducts are described, for example, in DE 21 05 777, DE 25 42 191 and DE 30 04 876. After being heated in the presence of appropriate hydroxyl compounds, these ε-caprolactam-blocked IPDI adducts provide coatings which combine great ease of handling with good leveling, hardness and elasticity and also good chemical resistance.

EP 0 056 167 describes powder coatings composed of a polyisocyanate hardener with ε-caprolactam-blocked isocyanate groups and acid groups and of a resin which either contains hydroxyl groups or can react to form hydroxyl groups. In additional, it is possible to use polyepoxides, such as triglycidyl isocyanurate (TGIC), which react with carboxyl groups present in the coating system. The powder coatings always possess glossy surfaces.

For a considerable time, there has been increasing interest in powder coating materials which provide a matte surface. The reason for this is predominantly practical in nature. Glossy surfaces require a far greater degree of cleaning than matte surfaces. Furthermore, on safety grounds it may be desirable to avoid strongly reflecting surfaces.

The simplest method of obtaining a matte surface is to mix varying amounts of fillers, such as chalk, finely divided silica or barium sulfate, for example, in the powder coating material in order to obtain the desired matte effect. However, adding fillers may cause deterioration in the film properties of the coating, such as adhesion, flexibility, impact strength, and chemical resistance.

The addition of substances incompatible with the coating material, such as waxes or cellulose derivatives, for example, can provide a matte surface, but slight changes during extrusion may lead to fluctuations in the surface gloss, and therefore the matte effect may not be reproducible.

Matte powder coatings of higher quality are obtained if the matte effect is formed by a chemical crosslinking reaction. For instance, EP 0 104 424 describes matte powder coating materials prepared from a carboxyl-containing, ε-caprolactam-blocked polyisocyanate crosslinker. The isocyanate groups of the crosslinker which are formed upon heating react with the hydroxyl groups of the polymer. The acid groups in the crosslinker react with a polyepoxide.

EP 0 698 629 claims a powder coating material which is composed of a hydroxyl-containing polyester, a polyisocyanate hardener containing blocked isocyanate groups and acid groups, and a β-hydroxyalkylamide. The powder coating surfaces are matte.

A disadvantage common to all these PU powder coating materials, however, is the release into the environment of the blocking agents that are eliminated in the course of thermal crosslinking. When these materials are processed, therefore, it is necessary to take environmental and workplace safety measures. Thus, among other precautions, the outgoing air is cleaned or the blocking agent is recovered. This fundamental disadvantage is overcome by the use of PU powder coating crosslinkers which are free from blocking agents, and contain uretdione groups.

Crosslinkers which can be used as crosslinkers for glossy or matte PU powder coatings, based on uretdiones and certain amines, are known. DE-A 195 46 750 describes hardeners for producing polyurethane (PU) coatings with glossy surfaces which are reaction products of isophorone diisocyanate uretdione and disecondary diamines.

DE-A 196 39 844 describes matte PU powder coating materials comprising isophorone diisocyanate uretdiones containing urea groups as a hardener component. These compounds are prepared by reacting uretdiones with water. Intermediates which form during this reaction, with the elimination of carbon dioxide, are primary amines, which react with remaining isocyanate groups to form ureas. In each case, the nitrogen atoms of the urea groups are monosubstituted. Reactions of polyisocyanates with water are difficult to reproduce, owing to the formation of by-products.

DE-A 196 37 375 describes PU powder coating materials which are formulated for a matte effect by means of hardeners comprising isophorone diisocyanate uretdiones containing urea groups. These hardeners are formed by the reaction of isophorone diisocyanate uretdione with disecondary diamines. The disecondary diamines are reaction products of diprimary diamines and maleic or fumaric esters.

DE-A 196 37 377 and DE-A 198 16 547 describe polyaddition products containing uretdione groups and urea groups as hardener components for preparing matte PU powder coating materials. These hardeners are prepared by reacting isophorone diisocyanate uretdione with diamines containing a primary amino group and secondary amino groups. Preparation of the pure diamines is complex and extremely costly.

All of these blocking-agent-free PU powder coating materials possess the disadvantages of providing coatings having poor flexibility and being prepared from relatively expensive precursors.

It is therefore an object of the present invention to provide blocking-agent-free crosslinkers prepared from polyaddition compounds containing uretdione groups, which can be processed in combination with hydroxyl-containing polymers and, if desired, compounds which react with carboxyl groups, such as polyepoxides or hydroxyalkylamides, to give PU powder coating materials whose coatings exhibit good mechanical properties and whose surfaces can be made matte or glossy in accordance with the intended application.

It has surprisingly been found that polyaddition compounds which contain uretdione groups as well as carboxyl groups as well achieve this object.

SUMMARY OF THE INVENTION

It is an object of the present invention to provide polyaddition compounds which contain uretdione and carboxyl groups, have melting point ranges of between 40 and 200° C., have a free NCO group content of from 0 to 5% by weight and an NCO functionality of at least 1.5, and whose number-average molar masses vary between 1000 and 10,000, prepared from the following starting components:
A) from 40 to 90% by weight of at least one polyisocyanate containing uretdione groups, and
B) from 3 to 30% by weight of at least one hydroxycarboxylic or mercaptocarboxylic acid, and
C) at least one monofunctional compound which is reactive toward isocyanates, and/or
D) at least one aliphatic and/or cycloaliphatic polyol, and/or
E) at least one further polyol containing functional groups, and/or
F) at least one aliphatic and/or cycloaliphatic polyamine, so that the total amount of C), D), E) and F) is from 57 to 3% by weight, where the ratio of C) to D) to E) to F) is freely selectable, and where a component may also be present individually.

It is another object of the present invention to provide a process for preparing polyaddition compounds which contain uretdione and carboxyl groups, have melting ranges of between 40 and 200° C., have a free NCO group content of from 0 to 5% by weight and an NCO functionality of at least 1.5, and whose number-average molar masses vary between 1000 and 10,000, by reacting at temperatures of from 40 to 200° C.:
A) from 40 to 90% by weight of at least one polyisocyanate containing uretdione groups,
B) from 3 to 30% by weight of at least one hydroxycarboxylic or mercaptocarboxylic acid,
C) at least one monofunctional compound which is reactive toward isocyanates, and/or
D) at least one aliphatic and/or cycloaliphatic polyol, and/or
E) at least one further polyol containing functional groups, and/or
F) at least one aliphatic and/or cycloaliphatic polyamine,
So that the total amount of C), D), E) and F) is from 57 to 3% by weight, where the ratio of C) to D) to E) to F) is freely selectable and where one of C), D), E), or F) may be present individually.

It is another object of the present invention to provide PU powder coating materials having good mechanical properties, prepared from the polyaddition compounds of the present invention, in conjunction with hydroxyl-containing polymers and, where appropriate, compounds which react with carboxyl groups. In addition, blocking-agent-free transparent or pigmented PU powder coatings with a glossy or matte surface may be prepared from polyaddition compounds containing uretdione groups.

It is another object of the present invention to provide blocking-agent-free transparent or pigmented PU powder coating materials which comprise the polyaddition compounds of the invention containing uretdione and carboxyl groups.

DETAILED DESCRIPTION OF THE INVENTION

The polyisocyanates A) of the present invention, containing uretdione groups, have an average isocyanate functionality of at least 2.0, and may be obtained in conventional fashion from any desired diisocyanate by catalytic dimerization of some of the isocyanate groups of simple diisocyanates, followed preferably by removal of the unreacted diisocyanate excess, for example by thin-film distillation. Diisocyanates which may be used to prepare the polyisocyanates A) may include aliphatic, cycloaliphatic, araliphatic and/or aromatic diisocyanates. Preferred diisocyanates may include, for example, 1,4-diisocyanatobutane, 1,6-diisocyanatohexane (HDI), 2-methylpentamethylene 1,5-diisocyanate (MPDI), 2,2,4(2,4,4)-trimethylhexamethylene diisocyanate (TMDI), 4,4'-diisocyanatodicyclohexylmethane ($H_{12}$MDI), 1,3- and 1,4-diisocyanatocyclohexane, isophorone diisocyanate (IPDI), norbornane diisocyanate, diphenylmethane 2,4'- and/or 4,4'-diisocyanate, xylylene diisocyanate or 2,4- and 2,6-tolylene diisocyanate, and any desired mixtures of these isomers. The polyisocyanates A) may be prepared from a single diisocyanate, or from a mixture of diisocyanates. The polyisocyanates containing uretdione groups can also be mixed with one another as desired.

In principle, any known compound which can catalyze the dimerization of isocyanate groups may be a suitable catalyst for preparing the polyisocyanates A) from the abovementioned diisocyanates. Such catalysts may include, for example, tertiary organic phosphines (U.S. Pat. No. 4,614,785, DE 1934763, DE 3900053), tris(dialkylamino) phosphines (DE 3030513, DE 3227779, DE 3437635), substituted pyridines (DE 1081895, DE 3739549), and substituted imidazoles or benzimidazoles (EP 417603). All of the above-noted references are herein incorporated by reference in their entirety.

Preferred polyisocyanates A) are polyisocyanates containing uretdione groups prepared from diisocyanates containing aliphatically and/or cycloaliphatically attached isocyanate groups. The uretdiones of isophorone diisocyanate (IPDI), of 2-methylpentamethylene 1,5-diisocyanate (MPDI), of 2,2,4(2,4,4)-trimethylhexamethylene diisocyanate (TMDI), of 4,4'-diisocyanatodicyclohexylmethane ($H_{12}$MDI), of norbornane diisocyanate (NBDI) and of 1,6-diisocyanatohexane (HDI) are particularly preferred. The uretdione of isophorone diisocyanate is very particularly preferred. An isocyanurate-free uretdione may be prepared from isophorone diisocyanate. This uretdione is highly viscous at room temperature, and has a viscosity of more than $10^6$ mPa·s; at 60° C. the viscosity maybe approximately $13·10^3$ mPa·s and at 80° C., approximately $1.4·10^3$ mPa·s. The free NCO content may be between 16.8 and 18.5% by weight; in other words, more or less high fractions of IPDI polyuretdione may be present in the reaction product. The monomer content is approximately 1% by weight. The overall NCO content of the reaction product after heating at from 180 to 200° C. is from 37.5 to 37.8% by weight.

The dimerization of other aliphatic diisocyanates using conventional processes and catalysts is accompanied by the formation, as a by-product, of isocyanurate in varying amounts, so that the NCO functionality of the isocyanurate-containing polyisocyanate uretdiones may be between 2 and 2.6.

The polyaddition compound of the present invention may comprise from 40 to 90% by weight of at least one polyisocyanate A) having uretdione groups, including 45, 50, 55, 60, 65, 70, 75, 80, and 85% by weight, inclusive of all values and subranges therebetween.

The hydroxycarboxylic or mercaptocarboxylic acid B) may comprise, for example, glycolic acid, thioglycolic acid, lactic acid, trichlorolactic acid, 2,2-bis(hydroxymethyl) propionic acid, 2,2-bis(hydroxymethyl)butyric acid, malic acid, dioxymaleic acid, dioxyfumaric acid, tartaric acid, dioxytartaric acid, mucic acid, saccharic acid, citric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6- dihydroxyisophthalic acid, oxyterephthalic acid, 5,6,7,8-tetrahydro-2-naphthol-3-carboxylic acid, 1-hydroxy-2-naphthoic acid, 2,8-dihydroxy-3-naphthoic acid, β-oxypropionic acid or m-oxybenzoic acid. A preferred acid is 2,2-bis(hydroxymethyl)propionic acid.

The polyaddition compound of the present invention may comprise from 3 to 30% by weight of at least one hydroxycarboxylic or mercaptocarboxylic acid B), including 4, 5, 6, 7, 8, 9, 10, 15, 20, and 25% by weight, inclusive of all values and subranges therebetween.

Monofunctional compounds C) which are reactive toward isocyanate groups may be used, if desired, to prepare the polyaddition compounds of the present invention. The monofunctional compounds C) serve to irreversibly block free NCO groups. The monofunctional compounds C) may include, in particular, monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, and also hydroxymethylcyclohexane, or simple aliphatic or cycloaliphatic monoamines such as methylamine, ethylamine, n-propylamine, isopropylamine, the isomeric butylamines, pentylamines, hexylamines and octylamines, n-dodecylamine, n-tetradecylamine, n-hexadecylamine, n-octadecylamine, cyclohexylamine, the isomeric methylcyclohexylamines, and also aminomethylcyclohexane, and secondary monoamines, such as dimethylamine, diethylamine, dipropylamine, diisopropylamine, dibutylamine, diisobutylamine, bis(2-ethylhexyl)amine, N-methyl- and N-ethylcyclohexylamine, and dicyclohexylamine, alone or in mixtures.

Polyols D), suitable for the synthesis of the polyaddition compounds of the present invention containing uretdione and carboxyl groups, may include all polyols commonly used in PU chemistry. For example, the polyols D) may include ethylene glycol, propane-1,3-diol, butane-1,4-diol, pentane-1,5-diol, 3-methylpentane-1,5-diol, hexane-1,6-diol, 2,2,4(2,4,4)-trimethylhexane-1,6-diol, neopentyl glycol hydroxypivalate, 1,4-di(hydroxymethyl)cyclohexane, diethylene glycol, triethylene glycol, diethanolmethylamine, neopentyl glycol, triethanolamine, trimethylolpropane, trimethylolethane, glycerol or pentaerythritol. The polyols D) may be used individually or in mixtures.

Suitable polyols E), containing additional functional groups, include linear or branched hydroxyl-containing polyesters, polycaprolactones, polycarbonates, polyethers, polythioethers, polyesteramides, polyurethanes or polyacetals having number-average molecular weights of from 134 to 3500. Linear hydroxyl-containing polyesters and polycaprolactones are preferred polyols E).

The polyaddition compound of the present invention may comprise in total from 57 to 3% by weight of components C), D), E), and F), including 55, 50, 45, 40, 35, 30, 25, 20, 15, 10, 9, 8, 7, 6, 5, and 4% by weight, inclusive of all values and subranges therebetween. The polyaddition compound may comprise any ratio of C), D), E), and F). For example C), D), E), and F) may be present individually (e.g., a polyaddition compound comprising A), B) and only one of C), D), E), and F)), or the polyaddition compound of the present invention may comprise A), B), and any combination of two or more of C), D), E), and F).

In addition, the polyaddition compounds of the present invention have melting point ranges of between 40 and 200° C., including melting points of 50, 60, 70, 80, 90, 100, 110, 120, 130, 140, 150, 160, 170, 180, and 190° C., inclusive of all values and subranges therebetween, and have a free NCO group content of from 0 to 5% by weight, including 1, 2, 3, and 4% by weight, inclusive of all values and subranges therebetween.

It is particularly advantageous to use hydroxyl-containing linear polyesters having a molar mass of between 250 and 2000, preferably from 300 to 1500. They are prepared, for example, by combining diols and dicarboxylic acids. In addition to the diols mentioned as polyols D), 2-methylpropanediol, 2,2-dimethylpropanediol, diethylene glycol, dodecane-1,12-diol and also trans- and cis-cyclohexanedimethanol are preferred for preparing the polyols E). Preferred dicarboxylic acids include aliphatic, optionally alkyl-branched dicarboxylic acids such as succinic, adipic, subyric, azelaic and sebacic acid and 2,2,4(2,4,4)-trimethyladipic acid. Furthermore, hydroxycarboxylic acids such as hydroxycaproic acid are also included in this class.

Aliphatic or cycloaliphatic polyamines F) may include all primary or secondary diamines or polyamines. Polyamines containing primary and secondary amino groups in one compound can be used, as can mixtures of primary and/or secondary and/or primary/secondary polyamines. Preferred polyamines may include those described in DE 195 46 750, DE 196 37 375, DE 196 37 377, DE 198 16 547 or DE 198 31 307, each of which is herewith incorporated by reference in its entirety.

The polyaddition compounds of the present invention, containing uretdione and carboxyl groups, can be prepared batchwise both in solvent and in bulk, i.e., without solvent.

Preparation of the polyaddition compounds of the present invention in a solvent takes place generally at temperatures of from 40 to 100° C., preferably between 60 and 90° C. Components B) and/or D) and/or E) and/or F) are introduced as an initial charge and the polyisocyanate containing uretdione groups, A), is added as quickly as possible without the reaction temperature exceeding the abovementioned limits. The reaction is over after from 30 to 150 minutes. Component C) may be present during the reaction or may be added after the end of reaction. Subsequently, the solvent is removed. Evaporation screws, film extruders or spray dryers are examples of apparatus suitable for this purpose.

Suitable solvents may include benzene, toluene or other aromatic or aliphatic hydrocarbons, acetates such as ethyl acetate or butyl acetate, ketones such as acetone, methyl ethyl ketone, methyl isobutyl ketone, or chlorinated aromatic and aliphatic hydrocarbons, and also any desired mixtures of these or other solvents which are inert toward the reactive groups of the composition of to the present invention.

Preparation of the polyaddition compounds of the present invention in a solvent-free reaction may take place batchwise in a tank reactor at temperatures of up to 200° C.

In order to accelerate the polyaddition reaction, it is also possible to use the catalysts customarily used in PU chemistry. Those which have proven particularly suitable include tin(II) and tin(IV) compounds, particularly dibutyltin dilaurate (DBTL). The catalysts may be used in a concentration of from 0.01 to 1% by weight, preferably from 0.03 to 0.5% by weight, based on the amount of reactants used.

The present invention additionally provides for preparing blocking-agent-free transparent or pigmented PU powder coatings with good mechanical properties and a glossy or matte surface from the polyaddition compounds containing uretdione and carboxyl groups of the present invention.

The present invention also provides blocking-agent-free transparent or pigmented PU powder coating materials comprising the polyaddition compounds of the present invention containing uretdione and carboxyl groups, polymers containing functional groups, if desired, compounds which react with carboxyl groups, such as polyepoxides or -hydroxyalkylamides, for example, and other auxiliaries and additives which are customarily used in PU chemistry.

Suitable polymers containing functional groups may include those which have functional groups which react with isocyanate groups during the curing operation as a function of temperature and time, for example hydroxyl, carboxyl, mercapto, amino, urethane, and (thio)urea groups. The polymers may be addition polymers, polycondensates, and polyaddition compounds.

Preferred polymers are primarily amorphous polymers such as polyethers, polythioethers, polyacetals, polyester amides, epoxy resins with hydroxyl groups in the molecule, amino resins, and amino resins modified with polyfunctional alcohols, polyazomethines, polyurethanes, polysulfonamides, melamine derivatives, cellulose esters and cellulose ethers, partially hydrolyzed homopolymers and copolymers of vinyl esters, alone or in mixtures, but especially hydroxyl-containing polyester resins and acrylic resins.

The preferred hydroxyl-containing polyesters have an OH functionality of >2, an OH number of from 20 to 200 mg KOH/g, preferably from 30 to 150 mg KOH/g, a viscosity of <60,000 mPa·s, preferably <40,000 mPa·s at 140° C., and a melting point of >70° C. to <120° C., preferably from 75° C. to 100° C.

The polyesters may be obtained by conventional process, for example by condensation in an inert gas atmosphere at temperatures of from 100 to 260° C., preferably from 130 to 220° C., in the melt, or in an azeotropic procedure, as described, for example, in Methoden der Organischen Chemie (Houben-Weyl), Vol. 14/2, 1–5, 21–23, 40–44, Georg Thieme Verlag, Stuttgart, 1963 or in C. R. Martens, Alkyd Resins, 51–59, Reinhold Plastics Appl. Series, Reinhold Publishing Comp., New York, 1961, or in DE 27 35 497 and DE 30 04 903, each of which are herein incorporated by reference.

The hydroxyacrylates may have an OH number of from 20 to 150 mg KOH/g. Their preparation is described, for example, in DE 30 30 539 and DE 197 30 669, each of which are herein incorporated by reference.

It is, of course, also possible to use mixtures of two or more substances as polyhydroxyl compounds.

The ratio of hydroxyl-containing polymers to the polyaddition compound of the present invention containing uretdione and carboxyl groups may be selected so that for each OH group there are from 0.5 to 1.2, preferably from 0.8 to 1.1, with very particular preference 1.0, NCO group(s).

The compounds which react with the carboxyl groups in the polyaddition compound of the present invention are preferably polyepoxides or -hydroxyalkylamides.

A large number of polyepoxides may be used in the powder coating formulation. The polyepoxides preferably have a 1,2-epoxy equivalent weight of more than 1, particularly preferably more than 1.9. Examples of polyepoxides include, for example, polyglycidyl ethers of aromatic polyols such as polyphenols or bisphenol A. It is also possible to use polyglycidyl ethers of polyalcohols, for example the polyalcohols 1,2-ethanediol, 1,2-propanediol, 1,3-propanediol, 1,4-butanediol, 1,5-pentanediol, diethylene glycol, triethylene glycol, polyethylene glycol and polypropylene glycol. Other polyepoxide compounds which can be used are those which function classically as crosslinkers in powder coating materials, for example ARALDIT PT 810 or ARALDIT PT 910 made by VANTICO.

Any β-hydroxyalkylamide may be used in the powder coating of the present invention, for example those described in EP 322 834, EP 957 082, EP 960 878, GB 1 489 485 and WO 00/55 266 (each of which is incorporated herein by reference in its entirety), N,N,N',N'-tetrakis(2-hydroxyethyl)adipamide, N,N,N',N'-tetrakis(2-hydroxypropyl)adipamide, N,N-bis(2-hydroxyethyl)-4-tert-butylphenylamide, and especially VESTAGON EP-HA 320 from Degussa, PRIMID XL-552, PRIMID QM 1260 and PRIMID SF 4510 from EMS and PROSID H and PROSID S from SIR Industriale.

The ratio between the compound which reacts with the carboxyl groups of the polyaddition compound of the present invention, and the polyaddition compound of the present invention, is selected so that for each hydroxyl or epoxide group there are from 0.5 to 1.6, preferably from 0.8 to 1.1, very particularly preferably 1.0, NCO group(s).

The powder coating materials of the present invention may further have from 0 to 50% by weight of pigments and/or inorganic fillers, for example $TiO_2$, color pigments, metallic pigments, effect pigments and/or barium sulfate.

The powder coating materials of the present invention additionally contain from 0 to 5% by weight of additives and/or auxiliaries, for example leveling agents, catalysts, devolatilizers, thixotropic agents, stabilizers such as polyacrylate resins, silicone oils (leveling agents); organotin compounds such as dibutyltin dilaurate (DBTL), tin(II) octoate, amines such as 1,5-diazabicyclo[4.3.0]non-5-ene (DBN), 1,4-diazabicyclo[2.2.2]octane (DABCO), 1,8-diazabicyclo[5.4.0]undec-7-ene (DBU), 4-(dimethylamino) pyridine (DMAP) (catalysts); benzoin (devolatilizer); benzotriazoles, HALS (Hindered Amine Light Stabilizer) compounds (UV stabilizers and free-radical scavengers). The pigments, fillers, and additives or auxiliaries may be varied correspondingly in nature and amount in the powder coating materials of the powder coating materials of the present invention, depending on the intended application and use.

In order to prepare PU powder coating materials, the polyaddition compounds of the present invention, containing uretdione and carboxyl groups, may be mixed with the appropriate hydroxyl-containing polymers, where appropriate with compounds which react with carboxyl groups, e.g., polyepoxides or β-hydroxyalkylamides, and, where appropriate, catalysts, and also pigments, fillers, and leveling agents, e.g., silicone oil or acrylic resins. In the case of liquid leveling agents, the addition may take place in the form of a masterbatch with the hydroxyl-containing polymer. All ingredients of the powder coating material are homogenized in the melt. This can be done in suitable apparatus, such as a heated kneading apparatus, for example, but preferably by extrusion, in the course of which upper temperature limits of from 130 to 140° C. should not be exceeded. After cooling to room temperature and appropriate comminution, the extruded mass may be ground to form a ready-to-spray powder. Application of the ready-to-spray powder to appropriate substrates may take place by the known methods, for example by electrostatic or tribostatic powder spraying, fluid-bed sintering or electrostatic fluid-bed sintering. Following the application of the powder, the coated workpieces may be cured by heating to a temperature of from 160 to 220° C. for from 60 to 10 minutes, preferably at from 170 to 200° C. for from 30 to 10 minutes.

Substrates which can be coated with a powder coating material comprising the polyaddition compound of the present invention can include any substrate which is be exposed to the curing conditions described above. For example, suitable substrates include plastics, metals, glasses and ceramics, and combinations thereof, or articles, such as vehicles, furniture, components of buildings, etc., comprised of plastics, metals, glasses and ceramics.

In comparison with conventional PU powder coating materials for preparing glossy or matte surfaces, based on externally blocked polyisocyanates containing carboxyl groups, the coatings formed from the PU powder coating materials of the present invention are more environmentally compatible. The coating films are very flexible and their surfaces can be adjusted to be either glossy or matte.

The polyaddition products of the present invention, the process for preparing the polyaddition products of the invention, the PU powder coating materials of the invention, and the process for preparing the PU powder coating materials of the invention are further described below with reference to examples. Having generally described this invention, a further understanding can be obtained by reference to certain specific examples which are provided herein for purposes of illustration only, and are not intended to be limiting unless otherwise specified.

EXAMPLES

A) Preparation of the Polyaddition Compounds of the Invention Containing
Uretdione and Carboxyl Groups Example 1

719 g of IPDI uretdione were dissolved in 450 ml of acetone, and 194 g of 2,2-bis(hydroxymethyl)propionic acid, 855 g of hexane-1,6-diol and 10 g of dibutyltin dilaurate were added so that the temperature of the reaction solution did not rise above 60° C. The reaction was monitored by titrometric determination of NCO. Thereafter, the solvent was removed and the product was cooled and, where appropriate, comminuted. The product had a latent NCO content of 13.7% and a melting range of from 134 to 137° C.

Example 2

753 g of IPDI uretdione were dissolved in 450 ml of acetone, and 155 g of 2,2-bis(hydroxymethyl)propionic acid, 911 g of hexane-1,6-diol and 10 g of dibutyltin dilaurate were so that the temperature of the reaction solution did not rise above 60° C. The reaction was monitored by titrometric determination of NCO. Thereafter the solvent was removed and the product was cooled and, where appropriate, comminuted. The product had a latent NCO content of 14.7% and a melting range of from 152 to 159° C.

B) Polyester

The PU powder coating material of the present invention was prepared with the polyester ALFTALAT AN 739 (Solutia; the OH component), having an OH number of from 55 to 60 mg KOH/g, an acid number of from 2 to 4 mg KOH/g, a melting point of from 82 to 90° C., and a viscosity at 160° C. of from 24 to 29 Pa·s.

C) Polyurethane Powder Coating Materials
General Preparation Instructions

The comminuted compounds—polyaddition compound containing uretdione and carboxyl groups (crosslinker), polyester resin (ALFTALAT AN 739), VESTAGON EP-HA 320, leveling agent RESIFLOW PV 88, benzoin devolatilizer, dibutyltin dilaurate catalyst and KRONOS 2160 white pigment—were intimately mixed in an edge runner mill and then homogenized in an extruder at from 80 to 140° C. After cooling, the extrudate was fractionated and ground to a particle size <100 m, using a pinned-disk mill. The powder thus produced was applied to degreased, optionally pre-treated iron panels using an electrostatic powder spray unit at 60 kV, and the panels were baked in a forced-air oven at 200° C. for 30 minutes.

Example 3

The formulation was composed of 155 g of the polyaddition compound from Example 1, 411 g of the polyester ALFTALAT AN 739, 19.2 g of VESTAGON EP-HA 320, 1.0 g of RESIFLOW PV 88 (leveling agent from Worlée Chemie), 5 g of benzoin (devolatilizer from Merck-Schuchardt), 1.5 g of DBTL (catalyst from Crompton Vinyl Additives GmbH) and 400 g of KRONOS 2160 (white pigment from Kronos).

Example 4

The formulation was composed of 129 g of the polyaddition compound from Example 2, 442 g of the polyester ALFTALAT AN 739, 13.5 g of VESTAGON EP-HA 320, 1.0 g of RESIFLOW PV 88 (leveling agent from Worlée Chemie), 5 g of benzoin (devolatilizer from Merck-Schuchardt), 1.5 g of DBTL (catalyst from Crompton Vinyl Additives GmbH) and 400 g of KRONOS 2160 (white pigment from Kronos).

TABLE 1

Film properties of the PU Powder Coatings

| Example | Crosslinker/polyester | Baking conditions | FT ($\mu$m) | Cupping (mm) | BI dir. (inch lb) | GG 60° |
|---|---|---|---|---|---|---|
| C3 | A1/B1 | 200° C./30' | 62–77 | >10 | >80 | 76 |
| C4 | A2/B1 | 200° C./30' | 63–84 | >10 | 60 | 20 |

The abbreviations in Table 1 have the following meanings:
FT = film thickness
Cupping = Erichsen cupping (DIN 53 156)
BI dir. = direct ball impact (DIN EN-ISO 6272)
GG 60 = Gardner gloss measurement (ASTM-D 5233)

The present application is based on German application 10227183.6, filed May 11, 2002, which is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A polyaddition compound having uretdione and carboxyl groups, and having a melting range of between 40 and 200° C., a free NCO group content of from 0 to 5% by weight and an NCO functionality of at least 1.5, and a number-average molar mass of between 1000 and 10,000, prepared by reacting the following starting components:

A) from 40 to 90% by weight of at least one polyisocyanate containing uretdione groups, B) from 3 to 30% by weight of at least one hydroxycarboxylic or mercaptocarboxylic acid, and 57 to 3% by weight of one or more of:

C) at least one monofunctional compound having a functional group which is reactive toward an isocyanate, D) at least one aliphatic and/or cycloaliphatic polyol, E) at least one polyol having functional groups, and F) at least one aliphatic and/or cycloaliphatic polyamine.

2. The polyaddition compound of claim 1, wherein the polyisocyanate containing uretdione groups A) is the dimerization product of an aliphatic, cycloaliphatic, araliphatic or aromatic diisocyanate.

3. The polyaddition compound of claim 2, wherein the polyisocyanate containing uretdione groups A) is the dimerization product of at least one diisocyanate selected from the group consisting of 1,4-diisocyanatobutane, 1,6-diisocyanatohexane (HDI), 2-methylpentamethylene 1,5-diisocyanate (MPDI), 2,2,4(2,4,4)-trimethylhexamethylene diisocyanate (TMDI), 4,4'-diisocyanatodicyclohexylmethane ($H_{12}$MDI), 1,3- and 1,4-diisocyanatocyclohexane, isophorone diisocyanate (IPDI), norbornane diisocyanate, diphenylmethane 2,4'- and/or 4,4'-diisocyanate, xylylene diisocyanate, 2,4- and 2,6-tolylene diisocyanate, and mixtures thereof.

4. The polyaddition compound of claim 3, wherein the polyisocyanate containing uretdione groups A) is the dimerization product of at least one diisocyanate selected from the group consisting of isophorone diisocyanate, 2-methylpentamethylene 1,5-diisocyanate, 2,2,4(2,4,4)-trimethylhexamethylene diisocyanate, 4,4'-diisocyanatodicyclohexylmethane, norbornane diisocyanate, 1,6-diisocyanatohexane, and mixtures thereof.

5. The polyaddition compound of claim 4, wherein the polyisocyanate containing uretdione groups A) is the dimerization product of IPDI.

6. The polyaddition compound of claim 1, wherein the hydroxycarboxylic or mercaptocarboxylic acid B) is at least one compound selected from the group consisting of glycolic acid, thioglycolic acid, lactic acid, trichlorolactic acid, 2,2-bis(hydroxymethyl)propionic acid, 2,2-bis(hydroxymethyl)butyric acid, malic acid, dioxymaleic acid, dioxyfumaric acid, tartaric acid, dioxytartaric acid, mucic acid, saccharic acid, citric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, oxyterephthalic acid, 5,6,7,8-tetrahydro-2-naphthol-3-carboxylic acid, 1-hydroxy-2-naphthoic acid, 2,8-dihydroxy-3-naphthoic acid, β-oxypropionic acid, m-oxybenzoic acid, and mixtures thereof.

7. The polyaddition compound of claim 6, wherein the hydroxycarboxylic or mercaptocarboxylic acid B) is 2,2-bis(hydroxymethyl)propionic acid.

8. The polyaddition of claim 1, prepared by reacting starting components comprising the polyisocyanate containing uretdione groups A), at least one hydroxycarboxylic or mercaptocarboxylic acid B), and at least one monofunctional compound C) selected from the group consisting of a monoalcohols, an aliphatic monoamine, and a cycloaliphatic monoamine.

9. The polyaddition compound of claim 8, wherein the monofunctional compound C) is selected from the group consisting of methanol, ethanol, n-propanol, isopropanol, n-butanol, isobutanol, sec-butanol, isomeric pentanols, hexanols, octanols and nonanols, n-decanol, n-dodecanol, n-tetradecanol, n-hexadecanol, n-octadecanol, cyclohexanol, isomeric methylcyclohexanols, hydroxymethylcyclohexane, methylamine, ethylamine, n-propylamine, isopropylamine, isomeric butylamines, pentylamines, hexylamines, octylamines, n-dodecylamine, n-tetradecylamine, n-hexadecylamine, n-octadecylamine, cyclohexylamine, isomeric methylcyclohexylamines, aminomethylcyclohexane, dimethylamine, diethylamine, dipropylamine, diisopropylamine, dibutylamine, diisobutylamine, bis(2-ethylhexyl)amine, N-methyl- and N-ethylcyclohexylamine, dicyclohexylamine, and mixtures thereof.

10. The polyaddition compound of claim 1, prepared by reacting starting components comprising the polyisocyanate containing uretdione groups A), at least one hydroxycarboxylic or mercaptocarboxylic acid B), and at least one aliphatic and/or cycloaliphatic polyol D) selected from the group consisting of ethylene glycol, propane-1,3-diol, butane-1,4-diol, pentane-1,5-diol, 3-methylpentane-1,5-diol, hexane-1,6-diol, 2,2,4(2,4,4)-trimethylhexane-1,6-diol, neopentyl glycol hydroxypivalate, 1,4-di(hydroxymethyl)cyclohexane, diethylene glycol, triethylene glycol, diethanolmethylamine, neopentyl glycol, triethanolamine, trimethylolpropane, trimethylolethane, glycerol, pentaerythritol, and mixtures thereof.

11. The polyaddition compound of claim 1, prepared by reacting starting components comprising the polyisocyanate containing uretdione groups A), at least one hydroxycarboxylic or mercaptocarboxylic acid B), and at least one polyol containing functional groups E), selected from the group consisting of linear hydroxyl-containing polyesters, branched hydroxyl-containing polyesters, polycaprolactones, polycarbonates, polyethers, polythioethers, polyesteramides, polyurethanes, polyacetals, and mixtures thereof, having number-average molecular weights of from 134 to 3500.

12. The polyaddition compound of claim 11, prepared by reacting starting components comprising the polyisocyanate containing uretdione groups A), at least one hydroxycarboxylic or mercaptocarboxylic acid B), and at least one polyol containing functional groups E) selected from the group consisting of linear hydroxyl-containing polyesters and polycaprolactones.

13. The polyaddition compound of claim 12, wherein the polyol containing functional group E) is a hydroxyl-containing linear polyester having a molar mass of between 250 and 2000.

14. The polyaddition compound of claim 1, prepared by reacting starting components comprising the polyisocyanate containing uretdione groups A), at least one hydroxycarboxylic or mercaptocarboxylic acid B), and at least one aliphatic and/or cycloaliphatic polyamine F) selected from the group consisting of primary diamines, secondary diamines, primary/secondary diamines, primary polyamines, secondary polyamines, primary/secondary polyamines, and mixtures thereof.

15. A process for preparing a polyaddition compound comprising reacting at temperatures of from 40 to 200° C.

A) from 40 to 90% by weight of at least one polyisocyanate containing uretdione groups, B) from 3 to 30% by weight of at least one hydroxycarboxylic or mercaptocarboxylic acid, and 57 to 3% by weight of one or more of:

C) at least one monofunctional compound which is reactive toward isocyanates,

D) at least one aliphatic and/or cycloaliphatic polyol,

E) at least one polyol having functional groups,

F) at least one aliphatic and/or cycloaliphatic polyamine thereby providing a polyaddition compound having uretdione and carboxyl groups, a melting range of between 40 and 200° C., a free NCO group content of from 0 to 5% by weight and an NCO functionality of at least 1.5, and a number-average molar mass of between 1000 and 10,000.

16. The process of claim 15, wherein said reacting is carried out in solution and a solvent is removed after said reacting has taken place.

17. The process of claim 15, wherein said reacting is carried out in the absence of a solvent.

18. The process of claim 15, wherein said reacting is carried out in the presence of at least one catalyst at a concentration of from 0.01 to 1% by weight, based on the total weight of compounds A) to F).

19. The process of claim 15, wherein the polyisocyanate containing uretdione groups A) is the dimerization product of an aliphatic, cycloaliphatic, araliphatic or aromatic diisocyanate.

20. The process of claim 15, wherein the polyisocyanate containing uretdione groups A) is the dimerization product of at least one diisocyanate selected from the group consisting of 1,4-diisocyanatobutane, 1,6-diisocyanatohexane (HDI), 2-methylpentamethylene 1,5-diisocyanate (MPDI), 2,2,4(2,4,4)-trimethylhexamethylene diisocyanate (TMDI), 4,4'-diisocyanatodicyclohexylmethane ($H_{12}MDI$), 1,3- and 1,4-diisocyanatocyclohexane, isophorone diisocyanate (IPDI), norbornane diisocyanate, diphenylmethane 2,4'- and/or 4,4'-diisocyanate, xylylene diisocyanate, 2,4- and 2,6-tolylene diisocyanate, and mixtures thereof.

21. The process of claim 15, wherein the polyisocyanate containing uretdione groups A) is the dimerization product of at least one diisocyanate selected from the group consisting of isophorone diisocyanate, 2-methylpentamethylene 1,5-diisocyanate, 2,2,4(2,4,4)-trimethylhexamethylene diisocyanate, 4,4'-diisocyanatodicyclohexylmethane, norbornane diisocyanate, 1,6-diisocyanatohexane, and mixtures thereof.

22. The process of claim 15, wherein the polyisocyanate containing uretdione groups A) is the dimerization product of IPDI.

23. The process of claim 15, wherein the hydroxycarboxylic or mercaptocarboxylic acid B) is at least one compound selected from the group consisting of glycolic acid, thioglycolic acid, lactic acid, trichlorolactic acid, 2,2-bis(hydroxymethyl)propionic acid, 2,2-bis(hydroxymethyl) butyric acid, malic acid, dioxymaleic acid, dioxyfumaric acid, tartaric acid, dioxytartaric acid, mucic acid, saccharic acid, citric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, oxyterephthalic acid, 5,6,7,8-tetrahydro-2-naphthol-3-carboxylic acid, 1-hydroxy-2-naphthoic acid, 2,8-dihydroxy-3-naphthoic acid, β-oxypropionic acid, m-oxybenzoic acid, and mixtures thereof.

24. The process of claim 15, wherein the hydroxycarboxylic or mercaptocarboxylic acid B) is 2,2-bis(hydroxymethyl)propionic acid.

25. The process of claim 15, wherein said reacting comprises reacting the polyisocyanate containing uretdione groups A), at least one hydroxycarboxylic or mercaptocarboxylic acid B), and at least one monofunctional compound C) selected from the group consisting of a monoalcohols, an aliphatic monoamine, and a cycloaliphatic monoamine.

26. The process of claim 25, wherein said monofunctional compound C) is selected from the group consisting of methanol, ethanol, n-propanol, isopropanol, n-butanol, isobutanol, sec-butanol, isomeric pentanols, hexanols, octanols and nonanols, n-decanol, n-dodecanol, n-tetradecanol, n-hexadecanol, n-octadecanol, cyclohexanol, isomeric methylcyclohexanols, hydroxymethylcyclohexane, methylamine, ethylamine, n-propylamine, isopropylamine, isomeric butylamines, pentylamines, hexylamines, octylamines, n-dodecylamine, n-tetradecylamine, n-hexadecylamine, n-octadecylamine, cyclohexylamine, isomeric methylcyclohexylamines, aminomethylcyclohexane, dimethylamine, diethylamine, dipropylamine, diisopropylamine, dibutylamine, diisobutylamine, bis(2-ethylhexyl)amine, N-methyl- and N-ethylcyclohexylamine, dicyclohexylamine, and mixtures thereof.

27. The process of claim 15, wherein said reacting comprises reacting the polyisocyanate containing uretdione groups A), at least one hydroxycarboxylic or mercaptocarboxylic acid B), and at least one aliphatic and/or cycloaliphatic polyol D) selected from the group consisting of ethylene glycol, propane-1,3-diol, butane-1,4-diol, pentane-1,5-diol, 3-methylpentane-1,5-diol, hexane-1,6-diol, 2,2,4(2,4,4)-trimethylhexane-1,6-diol, neopentyl glycol hydroxypivalate, 1,4-di(hydroxymethyl)cyclohexane, diethylene glycol, triethylene glycol, diethanolmethylamine, neopentyl glycol, triethanolamine, trimethylolpropane, trimethylolethane, glycerol, pentaerythritol, and mixtures thereof.

28. The process of claim 15, wherein said reacting comprises reacting the polyisocyanate containing uretdione groups A), at least one hydroxycarboxylic or mercaptocarboxylic acid B), and at least one polyol containing functional groups E), selected from the group consisting of linear hydroxyl-containing polyesters, branched hydroxyl-containing polyesters, polycaprolactones, polycarbonates, polyethers, polythioethers, polyesteramides, polyurethanes, polyacetals, and mixtures thereof, having number-average molecular weights of from 134 to 3500.

29. The process of claim 15, wherein said reacting comprises reacting the polyisocyanate containing uretdione groups A), at least one hydroxycarboxylic or mercaptocarboxylic acid B), and at least one polyol containing functional groups E), selected from the group consisting of linear hydroxyl-containing polyesters and polycaprolactones.

30. The process of claim 29, wherein the polyol containing functional groups E) is a hydroxyl-containing linear polyester having a molar mass of between 250 and 2000.

31. The process of claim 15, wherein said reacting comprises reacting the polyisocyanate containing uretdione groups A), at least one hydroxycarboxylic or mercaptocarboxylic acid B), and at least one aliphatic and/or cycloaliphatic polyamine F) selected from the group consisting of primary diamines, secondary diamines, primary/secondary diamines, primary polyamines, secondary polyamines, primary/secondary polyamines, and mixtures thereof.

32. A powder coating material comprising at least one polyaddition compound of claim 1.

33. The powder coating material of claim 32, further comprising polymers having functional groups, auxiliaries, and additives.

34. The powder coating material of claim 32, further comprising one or more of polymers containing functional groups, compounds which react with carboxyl groups, auxiliaries or additives.

35. The powder coating material of claim 32, further comprising hydroxyl-containing polymers.

36. The powder coating material of claim 35, wherein the ratio of the hydroxyl groups of the polymer to the isocyanate groups of the polyaddition product containing uretdione and carboxyl groups is 1:0.5 to 1.2.

37. The powder coating material of claim 35, wherein the ratio of the hydroxyl groups of the polymer to the isocyanate groups of the polyaddition product containing uretdione and carboxyl groups is 1:0.8 to 1.1.

38. The powder coating material of claim 35, wherein the ratio of the hydroxyl groups of the polymer to the isocyanate groups of the polyaddition product containing uretdione and carboxyl groups is 1:1.

39. The powder coating material of claim 32, further comprising hydroxyl-containing polyesters having a functionality >2, an OH number of from 20 to 200 mg KOH/g, a viscosity at 160 C of <60,000 mPa·s, and a melting point of >70° C. to <120° C.

40. The powder coating material of claim 32, further comprising hydroxyl-containing acrylates having an OH number of 25–150 mg KOH/g.

41. The powder coating material of claim 34, wherein the compound which reacts with carboxyl groups comprises a polyepoxide and/or β-hydroxyalkylamide.

42. The powder coating material of claim 41, the compound which reacts with carboxyl groups comprises a polyepoxide, and the polyepoxide has a 1,2-epoxy equivalent weight of more than 1.

43. The powder coating material of claim 41, wherein the compound which reacts with carboxyl groups comprises a polyglycidyl ether of an aromatic, aliphatic, cycloaliphatic or heterocyclic polyol.

44. The powder coating material of claim 41, wherein the compound which reacts with carboxyl groups is at least one β-hydroxyalkylamide selected from the group consisting of N,N,N',N'-tetrakis(2-hydroxyethyl)adipamide, N,N,N',N'-tetrakis(2-hydroxypropyl)adipamide, and N,N-bis(2-hydroxyethyl)-4-tert-butylphenylamide.

45. The powder coating material of claim 41, wherein the compound which reacts with carboxyl groups is a polyepoxide, and the ratio of the epoxide groups of the polyepoxide to the carboxyl groups of the polyaddition product containing uretdione and carboxyl groups is from 0.5 to 1.6:1.

46. The powder coating material of claim 41, wherein the compound which reacts with carboxyl groups is a β-hydroxyalkylamide, and the ratio of the hydroxyl groups of the β-hydroxyalkylamide to the carboxyl groups of the polyaddition product containing uretdione and carboxyl groups is from 0.5 to 1.6:1.

47. The powder coating material of claim 32, further comprising 0 to 5% by weight, based on the overall amount of powder coating material, of a catalyst.

48. The powder coating material of claim 47, wherein the catalyst is an organotin compound.

49. The powder coating material of claim 32, further comprising at least one additive selected from the group consisting of a white pigment, a color pigment, a metallic pigment, an effect pigment, barium sulfate, a leveling agent, a devolatilizer, a thixotropic agent, and a stabilizers.

50. A glossy coating prepared from the powder coating material of claim 32.

51. A matte coating prepared from the powder coating material of claim 32.

52. A method of preparing the glossy coating of claim 50, comprising:

applying the powder coating material to a substrate, heating the applied coating at a temperature of from 160 to 220° C. for 10 to 60 minutes.

53. A method of preparing the glossy coating of claim 51, comprising:

applying the powder coating material to a substrate, heating the applied coating at a temperature of from 160 to 220° C. for 10 to 60 minutes.

54. A substrate coated with a cured glossy coating, prepared by the method of claim 52.

55. A substrate coated with a cured matte coating, prepared by the method of claim 53.

* * * * *